(12) United States Patent
Hammer et al.

(10) Patent No.: US 7,561,266 B2
(45) Date of Patent: Jul. 14, 2009

(54) CALIBRATED SPECTROSCOPY INSTRUMENT AND METHOD

(75) Inventors: Michael R. Hammer, Sassafras (AU); Philip V. Wilson, Mount Waverley (AU)

(73) Assignee: Varian Australia Pty Ltd, Mulgrave, Victoria (AU)

( * ) Notice: Subject to any disclaimer, the term of this patent is extended or adjusted under 35 U.S.C. 154(b) by 288 days.

(21) Appl. No.: 11/789,619

(22) Filed: Apr. 25, 2007

(65) Prior Publication Data
US 2007/0258091 A1    Nov. 8, 2007

(51) Int. Cl.
*G01J 3/18*    (2006.01)
*G01J 3/28*    (2006.01)

(52) U.S. Cl. ........................ 356/334; 356/328

(58) Field of Classification Search ............ 356/326, 356/328, 331, 334
See application file for complete search history.

(56) References Cited

U.S. PATENT DOCUMENTS 4,692,883 A * 9/1987 Nelson et al. ............ 356/319
4,779,216 A    10/1988 Collins
2004/0090624 A1    5/2004 Yokota et al.

* cited by examiner

*Primary Examiner*—Fannie L Evans
(74) *Attorney, Agent, or Firm*—Bella Fishman

(57) ABSTRACT

A calibrated spectroscopy instrument and a method for calibrating a spectroscopy instrument are disclosed. The spectroscopy instrument includes a monochromator having a drive mechanism comprising a pair of spur gears for rotating a diffraction grating of the monochromator for selecting a desired wavelength. The drive mechanism is calibrated to account for eccentricities in the spur gears to provide an accurate conversion between selected angular settings for the drive mechanism and the wavelength of the diffracted light from the monochromator. The drive mechanism comprises a pinion spur gear and a main spur gear which each have an AGMA (American Gear Manufacturers' Association) rating of at least 10, which allows errors due to random tooth to tooth variations to be neglected. A calibration algorithm is derived which is based on the error due to eccentricities in the spur gears following a precise geometric cyclic pattern.

10 Claims, 1 Drawing Sheet even modest wavelength accuracies are formidable. For an accuracy of ±0.5 nm such as might be required for an ultraviolet-visible spectrophotometer, the angular accuracy requirement is about ±0.017 degrees. On the other hand for a monochromator intended for use in emission spectroscopy, having for example a wavelength accuracy requirement of ±0.03 nm, the rotational accuracy required is ±0.001 degrees.

CALIBRATED SPECTROSCOPY INSTRUMENT AND METHOD

CROSS-REFERENCE TO RELATED APPLICATION

This application is claiming priority of Australian Patent Application No. 2006902305 filed on May 3, 2006.

BACKGROUND OF THE INVENTION

The present invention relates to a spectroscopy instrument and in particular to calibration of a drive mechanism for a diffraction grating monochromator of the spectroscopy instrument.

Wavelength selection in a diffraction grating monochromator is achieved by changing the angular position of the grating element. The angular positioning accuracy required depends upon the desired wavelength accuracy, but the positional accuracies required for Such positional accuracy is difficult to achieve because of errors introduced by the diffraction grating itself and imperfections in its drive mechanism. Thus calibrations have to be performed to provide an accurate conversion between selected angular settings for the drive mechanism of the monochromator and the wavelength of the diffracted light from the monochromator.

The present invention seeks to provide a calibration method that is quick to complete and which provides good accuracy. The invention also seeks to provide a calibrated spectroscopy instrument.

SUMMARY OF THE INVENTION

According to the present invention, there is provided a spectroscopy instrument including a diffraction grating monochromator for selecting a desired wavelength, a drive mechanism for rotating the diffraction grating of the monochromator, the drive mechanism including a pinion spur gear and a main spur gear, programmable computing apparatus for operating the instrument which is programmed to operate the drive mechanism to rotate the diffraction grating of the monochromator to an actual angle $W_a$ to select a desired wavelength $\lambda$ in accordance with a calibration equation:

$$W_a = W_n + a*\sin(W_n*N) + b*\cos(W_n*N) + c*\sin(W_n) + d*\cos(W_n)$$

Where $W_n$ equals the nominal diffraction grating angle corresponding to the desired wavelength $\lambda$, N equals the gear ratio between the pinion gear and the main spur gear, and a, b, c and d are correction coefficients.

The above calibration equation is suitable when variation in the pitch of the grating lines of the diffraction grating is small enough to be ignored. This is not always the case, and thus preferably the calibration equation includes an additional term to allow for errors introduced by the diffraction grating, in which case the calibration equation is- $$W_a = W_n + a*\sin(W_n*N) + b*\cos(W_n*N) + c*\sin(W_n) + d*\cos(W_n) + e*\tan(W_n)$$

where e is another correction coefficient.

Preferably the programmable computing apparatus includes a non-volatile memory in which a value for each of the correction coefficients is stored.

The invention also provides a method for calibrating a drive mechanism of a diffraction grating monochromator for selecting a desired wavelength in a spectroscopy instrument having a multi element array detector, the drive mechanism including a pinion spur gear and a main spur gear, the method including:

(i) determining a reference location on the array detector for zero order light from the monochromator, (ii) operating the spectroscopy instrument to aspirate a known sample, (iii) driving the monochromator to a nominal angle $W_n$ for the diffraction grating for selecting a wavelength that corresponds with one of the spectral emission lines expected from the known sample, (iv) detecting an error measurement for the nominal angle of step (iii) from a difference in location on the array detector between the zero reference of step (i) and the spectral emission line of step (iii), (v) repeating steps (iii) and (iv) for each of the remaining known spectral emission lines to provide a data set of angle errors versus nominal angles, (vi) applying the data of step (v) using a least-squares method to a calibration equation of the form:

$$W_a = W_n + a*\sin(W_n*N) + b*\cos(W_n*N) + c*\sin(W_n) + d*\cos(W_n)$$

where $W_a$ equals the grating angle to which the diffraction grating must be set for the desired wavelength, $W_n$ equals the nominal grating angle corresponding to the desired wavelength, N equals the gear ratio between the pinion gear and the main spur gear, and a, b, c and d are correction coefficients to establish values for the coefficients a, b, c and d, thereby to provide a calibration equation for the drive mechanism to rotate the diffraction grating to an actual angle $W_a$ to select a desired wavelength $\lambda$ in knowledge of a nominal angle $W_n$ for that wavelength.

Preferably in step (vi) the data is applied to a calibration equation of the form:

$$W_a = W_n + a*\sin(W_n*N) + b*\cos(W_n*N) + c*\sin(W_n) + d*\cos(W_n) + e*\tan(W_n)$$

where e is another correction coefficient.

Preferably the known sample provides at least five (5) emission lines of known wavelength.

The invention involves a drive mechanism that includes a pair of spur gears. Analysis of such a drive mechanism reveals that there are three main sources of inaccuracy. First, there is eccentricity in the pinion gear. Second, there is eccentricity in the main gear. Third, there are tooth-to-tooth errors in either gear. The first two of these sources of inaccuracy are cyclic (eg. sinusoidal) of known periodicity. The third is random but is worst-case specified by the American Gear Manufacturers' Association (AGMA) rating of the gear. Based on a 720 tooth 0.4 module main gear and an 1800 l/mm grating the worst-case error contributed by random tooth-to-tooth errors has been calculated to yield the results shown in the following table:

TABLE 1

Table 1. Worst-case errors in a monochromator drive mechanism (defined in the text) using gears having the indicated AGMA rating.

| AGMA rating | Maximum wavelength error, nm |
|---|---|
| 6 | 0.127 |
| 7 | 0.091 |
| 8 | 0.066 |
| 9 | 0.047 |
| 10 | 0.033 |
| 11 | 0.024 |
| 12 | 0.017 |
| 13 | 0.012 |
| 14 | 0.009 |
| 15 | 0.006 |

As an indication, AGMA ratings 6-9 are generally considered as suitable for power transmission only (eg. agricultural machinery, automobiles). AGMA ratings from 10-15 are classed as instrumentation gears and AGMA ratings of 10 and 11 at least are readily achieved at low cost. It is evident from Table 1 that the contribution of random tooth-to-tooth variation in such gears represents only a minor contribution to the total wavelength errors observed. Indeed, the contribution from this source alone would be tolerable even for many emission monochromator applications. The recognition that tooth-to-tooth errors are at an acceptable level and that the other error sources follow a precise geometric pattern allows a more efficient calibration procedure to be adopted. Derivation of the calibration equation of the invention is explained below.

Thus, preferably, the spur gears of the drive mechanism each have an AGMA rating of at least 10.

Derivation of Calibration Equation

For the pinion spur gear, the error is sinusoidal with a period of one revolution. Thus, one can state that for a rotation of W degrees of the pinion gear, the actual rotation will be:

Actual rotation=$W+P \sin(W+\phi)$ where P is a constant and $\phi$ is a random but constant phase offset.

This can alternatively be written as

Actual rotation=$W+Q \sin(W)+R \cos(W)$ where $Q$ and $R$ are constants.

For the main spur gear the same principle applies but the angle is now W divided by the gear ratio. Thus, for an N:1 reduction:

Angle of main spur gear=$W/N+A/N \sin(W)+B/N \cos(W)+C \sin(W/N)+D \cos(W/N)$

After substituting $W_n=W/N$
$a=A/N$
$b=B/N$
$c=C/N$
$d=D/N$ this equation can be re-written in terms of the nominal grating angle ($W_n$) as:

$$W_a = W_n + a^* \sin(W_n{}^*N) + b^* \cos(W_n{}^*N) + c^* \sin(W_n) + d^* \cos(W_n) \quad (1)$$

The nominal grating angle ($W_n$) versus wavelength ($\lambda$) relationship for a monochromator is known and it is typically of the form:

$$\sin(W_n) = \text{const}^* K^* L^* \lambda \quad (2)$$

where K=the order in which the diffraction grating is used, and

L=lines per mm on the diffraction grating.

The constant and K are determinate, however the lines per mm on the grating can vary slightly from grating to grating and preferably this is allowed for. The formula (2) above can be simplified to:

$$\sin(W_n) = X^* \lambda \quad (3)$$

where X is a constant for any one instrument but can vary from the nominal value. The sensitivity of $W_n$ to changes in X can be computed by differentiating equation (3)

$D(\sin(W_n)) = \lambda \, dX$

Hence $\cos(W_n)^* d(W_n) = \lambda \, dX$

And $d(W_n)/dX = \lambda/\cos(W_n)$, but we know that $\lambda$ is proportional to $\sin(W_n)$ hence $D(W_n)/dX$ is proportional to $\sin(W_n)/\cos(W_n)$ ie: $\tan(W_n)$.

Thus the angle correction term for a lines/mm error in the grating is proportional to $\tan(W_n)$. Combining this with equation (1) gives:

$$W_a = W_n + a^* \sin(W_n{}^*N) + b^* \cos(W_n{}^*N) + c^* \sin(W_n) + d^* \cos(W_n) + e^* \tan(W_n) \quad (4)$$

For a better understanding of the invention and to show how it may be performed, an embodiment thereof will now be described, by way of non-limiting example only, with reference to the accompanying drawing.

DETAILED DESCRIPTION OF THE INVENTION

Figure 1:
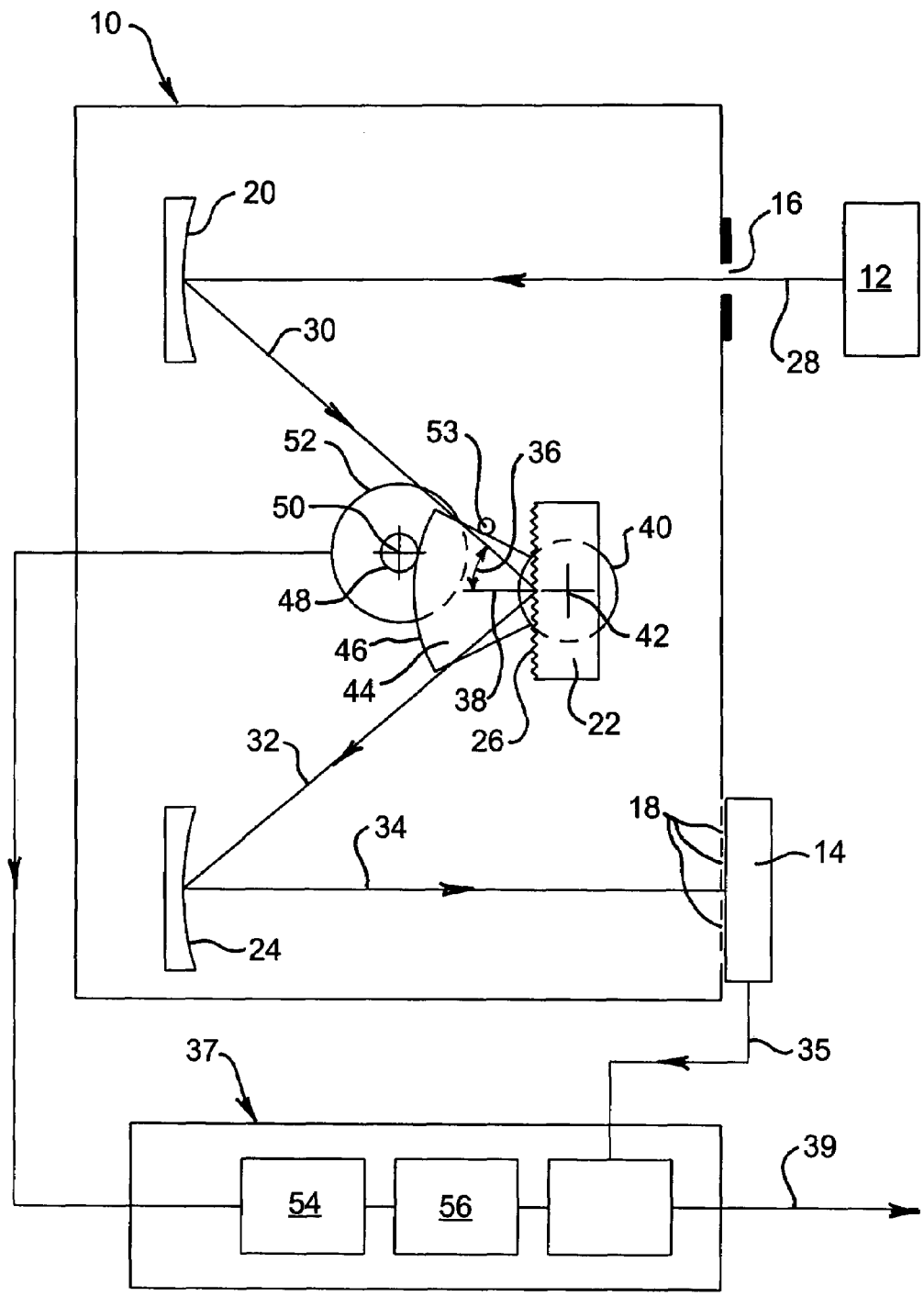
FIG. 1 schematically illustrates a monochromator of a spectroscopy instrument that includes a drive mechanism according to an embodiment of the invention.

FIG. 1 schematically illustrates a monochromator 10 of a spectroscopy instrument. Spectroscopy instruments are known and thus all that is otherwise illustrated of such an instrument is a source 12 of spectroscopic light that the instrument provides and an array detector 14 of the instrument. The array detector 14 is a multi element detector, that is, it includes a plurality of photosensitive detector elements 18, known as pixels, and is capable of measuring intensity as a function of position (which translates to wavelength when used with a monochromator) over at least a small range of wavelengths, eg. it may be a 256 element linear array spanning about 1-2 nm.

The monochromator 10 includes an entrance slit 16. Components within the monochromator 10 are a collimating mirror 20, a diffraction grating 22 and a focusing mirror 24. The diffraction grating 22 has a ruled surface 26. In operation, spectroscopic light 28 emitted from source 12 (which is preferably focused by known optical focusing means—not shown) enters entrance slit 16 and falls on collimating mirror 20, which reflects the light as a substantially collimated beam 30 onto the ruled surface 26 of the diffraction grating 22. The ruled surface 26 diffracts the incident light 30 and reflects a diffracted beam 32 onto the focusing mirror 24, and focusing mirror 24 reflects its incident light 32 into a beam 34 which is focused on array detector 14. Each pixel 18 of the array detector 14 generates an electrical signal 35 that is proportional to the intensity of that portion of beam 34 that reaches that pixel. The electrical signal 35 from each pixel 18 is passed to signal processing and computing apparatus 37 and is processed to generate a number for each pixel 18 that is directly related to the intensity of beam 34 at that pixel.

The wavelength of the light 34 that is detected by any given pixel 18 on detector 14 depends on the angle at which collimated beam 30 strikes the ruled surface 26 of the diffraction grating 22, which angle is indicated by reference 36 between beam 30 and a perpendicular line 38 to ruled surface 26. Changing the angle 36 changes the wavelength of the light 34 that is detected by a particular pixel on detector 14.

Diffraction grating 22 is rigidly mounted on a grating mount 40 which is rotatable about an axis of rotation 42. Rotation of the mount 40 about the axis 42 changes the angle 36 between the collimated beam 30 and the perpendicular line 38. A large or main spur gear 44 in the form of a segment with a toothed edge 46 is rigidly attached to grating mount 40 such that the pitch circle of its toothed edge 46 is concentric with the axis of rotation 42. A small or pinion spur gear 48, which has an axis of rotation 50 that is parallel to the axis of rotation 42, meshes with the main spur gear 44. The pinion spur gear 48 is rotatable about its axis of rotation 50 by an electric motor 52, which is preferably a digital stepping motor. The electric motor 52 is controlled by a driver 54 which is preferably part of the programmable computing apparatus 37, for example a digital computer, for operating the spectroscopy instrument. The electric motor 52, pinion spur gear 48 and main spur gear 44 constitute a drive mechanism for rotating the diffraction grating 22. Via inputs to the computer 37, the rotational position of the pinion spur gear 48 about its axis of rotation 50 can be selected, which consequentially, via main spur gear 44, determines the rotational position of the grating mount 40 about its axis of rotation 42 and thus the angle 36 for diffraction grating 22. Thus, various wavelengths of light 34 can be detected by operating the electric motor 52 to rotate the diffraction grating 22 to change the angle 36. The relationship between the angle 36 and detected wavelength depends on the characteristics of the ruled surface 26 as is known. The invention provides a method of calibration that gives an accurate conversion between a selected rotational setting of electric motor 52 and the wavelength of light 34 detected by a particular pixel 18 on detector 14.

The drive mechanism 52-48-44 includes an end stop (for example a mechanical stop, micro-switch or opto interrupter—schematically shown by reference 53), that is, a stop which leaves the diffraction grating 22 of the monochromator a small but unknown distance below the zero order position.

The calibration procedure uses a single sample which contains a cocktail of typically about eight elements giving emission at 8-10 spectral lines. The composition of the sample is specified. It must be correct with respect to the elements present although there is a considerable degree of latitude in the concentration required for each element. The elements and lines are chosen so that they are well spaced across the wavelength range of the spectrometer and so that for each line there are no interfering lines within about 1-2 nm of the lines of interest.

The spectroscopy instrument may be an emission spectrometer that uses a plasma source. The calibration procedure is as follows:

First, with the plasma running, the monochromator 10 is driven to its end stop 53. It is then driven forwards until the zero order line is detected on the array detector 14. From the pixel number of the array detector 14 on which the zero order line is detected, the angle change required to put this zero order line onto the central pixel element of the array 14 is computed. The resultant angle becomes the zero reference for the wavelength drive algorithm within the software. This step of establishing the zero reference does not require aspiration of the calibration solution. It can be done while aspirating a blank solution or no solution at all. This step is carried out each time the spectroscopy instrument is powered up. The remainder of the calibration procedure need only be carried out when the monochromator drive mechanism 52-48-44 is re-assembled after a disassembly, or as part of a validation exercise. It does not need to be carried out at each power up.

The coefficients a, b, c, d, e of the calibration equation are then set to zero. Then $W_a = W_n$ and if there are no errors in the drive mechanism 48-44, all emission lines should be detected on the central pixel of the array detrector 14.

Then, after ensuring the plasma is aspirating the calibration solution, the diffraction grating 22 of the monochromator 10 is driven to each of the specified wavelengths in turn (these wavelengths are pre-chosen to correspond to spectral emission lines of interest which are expected from the calibration solution). For each wavelength, the particular pixel of the array detector 14 which gives the peak signal is noted. An estimate of the peak position is derived by calculating the peak centroid of the signal, using pixels to either side of the pixel in which the highest signal was noted. The wavelength error, if any, is represented by the difference between the peak position and the central pixel of the array. This pixel difference is converted to a wavelength difference and thus a grating angle difference. A minimum of one such measurement per correction coefficient is required to calculate a unique solution for the correction coefficients a to e, but in order to allow for possible noise in the measurement system, a more accurate result can be obtained by measuring 8-10 wavelengths.

The output from the preceding steps is a table of angle errors versus nominal angles. This data is used to calculate the value of the correction coefficients a to e as described below.

The values of the correction coefficients a to e are preferably stored in non-volatile memory 56 of the computer apparatus 37. Whenever a new target wavelength is desired, the known grating law (see equation (2)) is used to calculate $W_n$ and then this value of $W_n$ is inserted in equation (4) to compute a $W_a$ to which the wavelength drive then moves.

The above procedure can be used even when the drive mechanism 52-48-44 does not have enough resolution to achieve positioning within one pixel on the array detector 14. For example, if one micro step of the stepper motor 52 corresponds to a wavelength shift of about 150 pm and each successive pixel on the array detector 14 corresponds to a wavelength shift of about 25 pm, the smallest wavelength drive step will move a line by about six pixels across the surface of the array detector 14. In such cases, when $W_a$ is converted to a step count, the answer will not be an integer but will have a fractional component. The wavelength drive circuitry 54 drives to the nearest integer count and the fraction count error is converted to a pixel deviation from the centre pixel and thus a pixel number on which the initial signal is expected. All wavelength errors are computed relative to this expected peak position rather than the centre pixel of the array detector 14. This approach is also used after calibration (in general operation). When driving to a specified wavelength the fractional portion of a step is allowed for by shifting the nominal pixel on which the signal is expected away from the central pixel by an amount corresponding to the fractional step error.

Coefficient Estimation

For each calibration wavelength $\lambda_i$ an equation based on equation (4) is constructed:

$$W_{ai} = W_{ni} + a^* \sin(W_{ni}^* N) + b^* \cos(W_{ni}^* N) + c^* \sin(W_{ni}) + d^* \cos(W_{ni}) + e^* \tan(W_{ni}) + W_{ei} \quad (5)$$

where the additional term, $W_{ei}$, represents the residual angular error at wavelength $\lambda_i$ after applying the error correction (4). When using more than five wavelengths to estimate the five correction coefficients (a,b,c,d,e), the method of least squares is adopted so as to minimise the sum of the squares of these residual angular errors.

After substituting $W_{di} = W_{ai} - W_{ni}$
$f1(W_{ni}) = \sin(W_{ni}*N)$
$f2(W_{ni}) = \cos(W_{ni}*N)$
$f3(W_{ni}) = \sin(W_{ni})$
$f4(W_{ni}) = \cos(W_{ni})$
$f5(W_{ni}) = \tan(W_{ni})$ the equations at the measured wavelengths can be expressed in matrix form:

$$\begin{vmatrix} W_{d1} \\ W_{d2} \\ \cdots \end{vmatrix} = \begin{vmatrix} f1(W_{n1}) & f2(W_{n1}) & f3(W_{n1}) & f4(W_{n1}) & f5(W_{n1}) \\ f1(W_{n2}) & f2(W_{n2}) & f3(W_{n2}) & f4(W_{n2}) & f5(W_{n2}) \\ \cdots & \cdots & \cdots & \cdots & \cdots \end{vmatrix} \cdot \begin{vmatrix} a \\ b \\ c \\ d \\ e \end{vmatrix} + \begin{vmatrix} W_{e1} \\ W_{e2} \\ \cdots \end{vmatrix}$$

Or, more compactly:

$$W_d = F \cdot A + W_e \qquad (6)$$

Based on the method of least squares, an explicit solution for (6) that minimizes the sum of the squares of the errors ($W_{ei}$) is given by:

$$A = (F^T \cdot F)^{-1} \cdot F^T \cdot W_d \qquad (7)$$

where $F^T$ is the transpose of matrix F, and $(F^T \cdot F)^{-1}$ is the matrix inverse of the square matrix $(F^T \cdot F)$. Provided the wavelengths used are distinct and the nominal angles calculated from those wavelengths do not all lie at exact integer multiples of the pinion gear 48 period (an extremely improbable coincidence that can easily be remedied by changing the selected calibration wavelengths), the matrix inverse will exist and the correction coefficients will be calculated as the elements of vector A.

EXAMPLE

Monochromator 10 readout resolution was quantised by array detector 14 pixel 18 size to 0.02 nm.

Optical source 12: mercury pen ray lamp.

Some lines were measured in second or third order, most in first order.

Seven wavelengths were used as a calibration set in a least-squares algorithm and then a further twelve wavelengths were measured. Based on experience with Varian Inc.'s Cary 50 instrument, the uncorrected wavelength errors (allowing for differences in 1/mm of each grating and diameters of each main gear) were expected to be about 0.2 nm, corresponding to 10 pixels.

The results are shown in Table 2.

TABLE 2

Residual errors after calibration of a monochromator drive mechanism according to the invention using the lines indicated by "*"

| Wavelength (nm) | Line used for calibration (indicated by '*') | Residual error after calibration (in pixels) |
| --- | --- | --- |
| 253.65 | * | 1 |
| 296.73 |   | 2 |
| 302.15 |   | 2 |
| 313.16 |   | 2 |

TABLE 2-continued

Residual errors after calibration of a monochromator drive mechanism according to the invention using the lines indicated by "*"

| Wavelength (nm) | Line used for calibration (indicated by '*') | Residual error after calibration (in pixels) |
| --- | --- | --- |
| 334.15 |   | 0 |
| 365.01 | * | 0 |
| 404.66 | * | 1 |
| 407.78 |   | -1 |
| 435.83 | * | 1 |
| 507.30 | * | 0 |
| 546.08 | * | -1 |
| 576.96 |   | 0 |
| 579.07 |   | 0 |
| 593.46 |   | -2 |
| 604.30 |   | 0 |
| 626.32 |   | -1 |
| 730.02 |   | -2 |
| 809.31 | * | 0 |
| 815.56 |   | 2 |

Subsequent measurements using a plasma source and a single calibration solution containing eight chemical elements showed that a complete calibration, including all measurements and subsequent calculations, can be completed in less than ten seconds.

The other issue of importance for a drive mechanism 52-48-44 of the invention is the reproducibility—how much does the reading of the intensity of a spectral line indicated by the associated spectrometer change when the monochromator 10 is moved from a first wavelength to a second wavelength and then back to the first wavelength. This was tested by repeatedly taking a reading at a specific wavelength, driving the monochromator 10 to a randomly-selected second wavelength and then back to the wavelength of interest. This was repeated 400 times and the standard deviation of the measured results was calculated. Since the variation measured will be due to variations in the output of the mercury pen lamp and random noise, a control experiment was also run (also over 400 replicates) using the same procedure but without driving the monochromator mechanism.

The variation recorded in the spectrometer reading without the monochromator mechanism 52-48-44 being driven corresponded to a relative standard deviation of 0.47%.

With the monochromator mechanism 52-48-44 driven to random wavelengths and back again as explained above the variation in the spectrometer reading corresponded to a relative standard deviation of 0.65%. Assuming that the two sources of variation are independent, a sum of squares rule applies and the contribution of the wavelength variation to the total variation is $(0.65^2 - 0.47^2)^{1/2} = 0.45\%$ RSD. This level of additional variation would be tolerable in an emission spectrometer that incorporated such a monochromator.

The invention described herein is susceptible to variations, modifications and/or additions other than those specifically described and it is to be understood that the invention includes all such variations, modifications and/or additions which fall within the scope of the following claims.

what is claimed is:

1. A spectroscopy instrument comprising:
   a diffraction grating monochromator for selecting a desired wavelength;
   a drive mechanism for rotating the diffraction grating of the monochromator,
   the drive mechanism comprising a pinion spur gear and a main spur gear; and programmable computing apparatus for operating the instrument, which is programmed to operate the drive mechanism to rotate the diffraction grating of the monochromator to an actual angle $W_a$ to select a desired wavelength λ in accordance with a calibration equation:

$$W_a = W_n + a*\sin(W_n*N) + b*\cos(W_n*N) + c*\sin(W_n) + d*\cos(W_n)$$

where $W_n$ equals the nominal diffraction grating angle corresponding to the desired wavelength λ, N equals the gear ratio between the pinion gear and the main spur gear, and a, b, c and d are correction coefficients.

2. The spectroscopy instrument as claimed in claim 1, wherein the calibration equation comprises an additional term:

$$+e*\tan(W_n)$$

wherein e is another correction coefficient.

3. The spectroscopy instrument as claimed in claim 2, wherein the programmable computing apparatus comprises a non-volatile memory in which a value for each of the correction coefficients is stored.

4. The spectroscopy instrument as claimed in claim 1, wherein the spur gears each has an American Gear Manufactures' Association (AGMA) rating of at least 10.

5. The spectroscopy instrument as claimed in claim 1, wherein the drive mechanism comprises a stop for setting a zero order reference for calibration of the instrument.

6. The spectroscopy instrument as claimed in claim 1, further comprising a multi element linear array detector.

7. A method for calibrating a drive mechanism of a diffraction grating monochromator for selecting a desired wavelength in a spectroscopy instrument having a multi element array detector, the drive mechanism comprising a pinion spur gear and a main spur gear, the method comprising the steps of:
  (i) determining a reference location on the array detector for zero order light from the monochromator,
  (ii) operating the spectroscopy instrument to aspirate a known sample,
  (iii) driving the monochromator to a nominal angle $W_n$ for the diffraction grating for selecting a wavelength that corresponds with one of the spectral emission lines expected from the known sample,
  (iv) detecting an error measurement for the nominal angle of step (iii) from a difference in location on the array detector between the zero reference of step (i) and the emission line of step (iii),
  (v) repeating steps (iii) and (iv) for each of the remaining known emission lines to provide a data set of angle errors versus nominal angles, and
  (vi) applying the data of step (v) using a least-squares method to a calibration equation of the form:

$$W_a = W_n + a*\sin(W_n*N) + b*\cos(W_n*N) + c*\sin(W_n) + d*\cos(W_n)$$

where $W_a$ equals the grating angle to which the diffraction grating must be set for the desired wavelength, $W_n$ equals the nominal grating angle corresponding to the desired wavelength, N equals the gear ratio between the pinion gear and the main spur gear, and a, b, c and d are correction coefficients to establish values for the coefficients a, b, c and d, thereby to provide a calibration equation for the drive mechanism to rotate the diffraction grating to an actual angle $W_a$ to select a desired wavelength α in knowledge of a nominal angle $W_n$ for that wavelength.

8. The method for calibrating a drive mechanism as claimed in claim 7, wherein in step (vi) the data is applied to a calibration equation of the form:

$$W_a = W_n + a*\sin(W_n*N) + b*\cos(W_n*N) + c*\sin(W_n) + d*\cos(W_n) + e*\tan(W_n)$$

wherein e is another correction coefficient.

9. The method as claimed in claim 8, wherein said values for each of the correction coefficients are determined by calibrating the instrument using a known sample that provides at least as many emission lines of known wavelength as there are coefficients to be determined.

10. The method as claimed in claim 9, wherein the known sample provides at least eight spectral emission lines of known wavelength.

* * * * *